United States Patent [19]
Zielczynski et al.

[11] 3,710,116
[45] Jan. 9, 1973

[54] DOSIMETER FOR PENETRATING IONIZING RADIATION OF ANY COMPOSITION AND SPECTRUM

[76] Inventors: Mieczyslaw Zielczynski, Nowatki 35 m 99; Krzysztof Zarnowiecki, Stoleizna 2 m 99, both of Warszawa, Poland

[22] Filed: March 4, 1969

[21] Appl. No.: 804,146

[30] Foreign Application Priority Data

March 5, 1968 Poland .............................. P 125,622

[52] U.S. Cl. .............................. 250/83.6 R, 313/93
[51] Int. Cl. .............................. G01t 1/02, H01j 39/28
[58] Field of Search .............................. 250/83.6; 313/93

[56] References Cited

UNITED STATES PATENTS 3,287,560  11/1966  Morgan .............................. 250/83.6 R
3,414,726  12/1968  Chameroy .............................. 250/83.6 R

*Primary Examiner*—Archie R. Borchelt
*Attorney*—Irvin A. Lavine

[57] ABSTRACT

A dosimeter includes a detector provided with a cylindrical inner measuring electrode and a pair of outer semi-cylindrical voltage electrodes, the latter being supplied with voltages of opposite polarity to provide in the space between electrodes a differential chamber having a first saturated volume and a second volume for column recombination of ions, the two volumes overlapping: a recorder connected with the measuring electrode provides a measure of dose equivalent.

5 Claims, 1 Drawing Figure

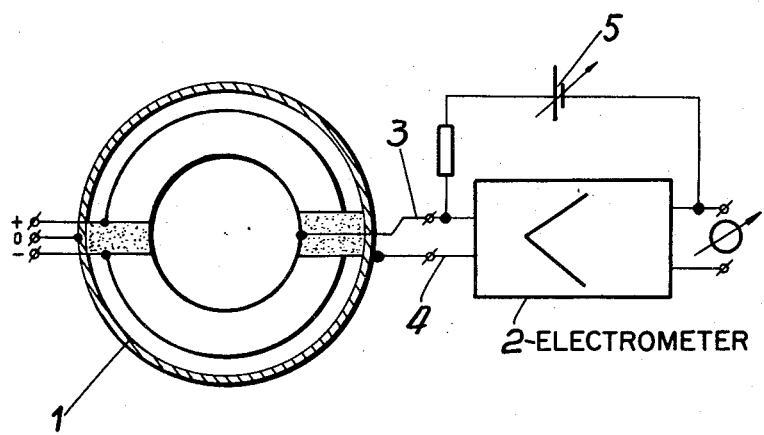

DOSIMETER FOR PENETRATING IONIZING RADIATION OF ANY COMPOSITION AND SPECTRUM

The subject of this invention is an ionizing radiation dosimeter used to determine the degree of noxiousness of primary and scattered radiation occurring in outer space and in the neighborhood of accelerators, reactors and other types of nuclear equipment, and especially in all those places where the composition and spectrum of radiation is intricate or unknown.

Dosimeters hitherto in use, and portable dosimeters in particular, have been designed for operation with detectors suitable for measuring one specific kind of radiation only. In the event several detectors are used at a time, i.e. practically in the case of dosimetric stationary sets, it is possible to determine in a continuous manner the dose and also the dose equivalent of the plurality component radiation provided this radiation has a limited energy spectrum. For instance, there are known dosimetric sets for gamma-neutron radiation of an energy not exceeding 20 MeV.

From theoretical consideration, there is known a mixed radiation dose equivalent detector, the so-called differential recombination chamber.

The endeavor to use this detector in combination with an electrometer to form a non-laboratory dosimeter, i.e., a portable dosimeter in particular, was not successful due to the arising necessity for frequent unsealing of the chamber to perform precision control operations with regard to active volumes of both parts of the chamber, whose ratio had to remain constant in connection with the differential character of measurement, and this could be implemented under the laboratory conditions only. With the maladjusted active volumes of the chamber, the differential recombination current measured by the electrometer and representing only 4 percent of the current flowing through one part of the recombination chamber thereby becomes a measure of the non-identity of the geometry of these active volumes, thus rendering any precision of measurement impossible. To give an example, a difference of the order of 1 percent in the active volumes of the chamber brought about in the case of the low density ionization radiation, e.g. gamma radiation, an error of the dose equivalent measurement ranging up to 25 percent.

The object of this invention is to provide a mixed radiation dosimeter with direct dose equivalent reading facilities, which dosimeter would be suitable for use as a portable dosimeter too.

To achieve this object, a system would be provided which would make possible measurement of the differential recombination chamber current and would permit an easy control of the active volume ratio with regard to both chamber parts without the need for unsealing the chamber itself.

This object has been achieved by introducing as a detector a differential chamber made of a tissue-equivalent material, in which chamber one of the parts operates in the saturation condition whereas the other one provides room for column recombination of ions; and as a recording instrument a feedback-operated electrometer having an input terminal in direct contact with the measuring electrode of the chamber whereas the other terminal is short-circuited to the housing and protection ring of the chamber, the feedback circuit of the electrometer having a variable direct-voltage source. By controlling the value and polarity of voltage on the electrometer input terminals by the voltage source provided in the feedback circuit, there may be increased the volume of one or another part of the chamber by the part of the volume contained between the measuring electrode of the chamber and its protection ring. In such a way it is possible to control the ratio of the differential chamber active volumes within 1–2 percent limits without dismantling the chamber itself.

Negative feedback helps to maintain during the process of measurement, the practical inchangeability of voltage on the electrometer input terminals irrespective of the chamber current value.

The drawing is a diagrammatic representation of an exemplary embodiment of the present invention showing the wiring diagram of the differential chamber and electrometer. In the drawing there is shown a cylindrical differential chamber 1, made of a tissue-equivalent material and filled with gas, there the two active volumes of the chamber each contained between spaced, opposed surfaces of the outer, semi-cylindrical voltage electrodes and inner measuring cylindrical electrode, supply voltages are fed to the outer semi-cylindrical voltage electrodes these supply voltages being, opposite in their polarity as indicated at the left portion of the figure, and ensure saturation in one part of the chamber and give rise to an electric field in the other part of the chamber, which causes column recombination of ions proportional to the ionizing radiation quality factor in the other part of the chamber. The overlapping active volumes / stippled area/are those volumes which are controlled by changing the potentials on the terminals 3 of the measuring electrode of the differential chamber 1, and terminal 4 of the protection ring. Said terminal 3 is the output connection of the measuring electrode of the differential chamber 1 and is connected galvanically to the feedback-loop-covered output of electrometer 2, which loop incorporates direct-voltage source 5 allowing the voltage between terminals 3, 4 on the input of electrometer 2 to be adequately controlled and thus causing the volume of one part of the chamber to be increased by the volume covered by the electric field produced due to the presence of potential difference between the measuring electrode and housing i.e., the protection ring. The electrometer 2 has, across the output thereof connected a swing type meter calibrated in dose rate equivalent units, rem/h.

What is claimed is:

1. A dosimeter for penetrating ionizing radiation of any composition and spectrum comprising:
   a detector of tissue equivalent material having an annular chamber therein; said detector comprising means for providing in said chamber a first generally semi-annular saturated portion and a second generally semi-annular ion column recombination portion generally opposite to and overlapping at least part of said first portion, said means comprising an inner cylindrical electrode and a pair of oppositely disposed substantially semi-cylindrical outer voltage electrodes outwardly of said inner electrode and means for applying voltages of opposite polarity to said outer electrodes, and means for varying the ratio of said first portion to said second portion.

2. The dosimeter of claim 1, and recording means having an input terminal connected with said inner cylindrical electrode, and including an electrometer.

3. The dosimeter of claim 2, and a protection ring surrounding said electrodes, said recording means having another input terminal thereof connected to said protection ring.

4. The dosimeter of claim 3, and a feedback loop extending between the input and output of said electrometer, said feedback loop including a variable direct voltage source.

5. The dosimeter of claim 1, said last mentioned means comprising means for applying a variable direct voltage to said inner electrode.

* * * * *